US010012256B2

(12) United States Patent
Sutt, Jr.

(10) Patent No.: US 10,012,256 B2
(45) Date of Patent: Jul. 3, 2018

(54) SHEAR WALL PERFORMANCE IMPROVING FASTENER

(71) Applicant: Simpson Strong-Tie Company, Inc., Pleasanton, CA (US)

(72) Inventor: Edward G. Sutt, Jr., Gallatin, TN (US)

(73) Assignee: SIMPSON STRONG-TIE COMPANY, INC., Pleasanton, CA (US)

( * ) Notice: Subject to any disclaimer, the term of this patent is extended or adjusted under 35 U.S.C. 154(b) by 0 days.

(21) Appl. No.: 15/099,173

(22) Filed: Apr. 14, 2016

(65) Prior Publication Data

US 2017/0298974 A1   Oct. 19, 2017

(51) Int. Cl.
*F16B 15/06* (2006.01)
*F16B 15/00* (2006.01)
*E04B 2/00* (2006.01)

(52) U.S. Cl.
CPC ............ *F16B 15/06* (2013.01); *E04B 2/00* (2013.01); *F16B 15/00* (2013.01)

(58) Field of Classification Search
CPC .......... F16B 15/00; F16B 15/06; F16B 33/02; F16B 35/041
USPC .......... 411/411, 424, 451.1, 451.3, 452, 456, 411/474, 487, 490, 494, 496
See application file for complete search history.

(56) References Cited

U.S. PATENT DOCUMENTS

| 289,333 | A | * | 11/1883 | Bray | F16B 15/06 411/394 |
| 364,300 | A | * | 6/1887 | Rogers | F16B 15/06 411/394 |
| 364,301 | A | * | 6/1887 | Rogers | F16B 15/06 411/453 |
| 368,687 | A | * | 8/1887 | Rogers | F16B 15/06 411/455 |
| 1,428,247 | A | * | 9/1922 | Morris | F16B 15/0092 411/455 |
| 1,918,936 | A | * | 7/1933 | Shearman | F16B 15/06 411/456 |

(Continued)

FOREIGN PATENT DOCUMENTS

| GB | 1072609 A | 6/1967 |
| JP | H06241215 H | 8/1994 |

(Continued)

OTHER PUBLICATIONS

International Search Report and Written Opinion dated Sep. 8, 2017, in PCT Application No. PCT/US2017/027245.

*Primary Examiner* — Roberta S Delisle
(74) *Attorney, Agent, or Firm* — Vierra Magen Marcus LLP

(57) ABSTRACT

A fastener comprises a shank having a first end having a point and a second end having a head. The shank includes a first region beginning at the first end and having a cylindrical cross-section with a first diameter along at least a portion of the first region; and a second region extending from the first region to the head and having a cross section with a second diameter greater than the first diameter. The first region may include a distortion adjacent the tip encompassing at least a portion of a surface of the first region, the distortion having a third diameter greater than the first diameter and less than or equal to the second diameter.

18 Claims, 4 Drawing Sheets

(56) References Cited

U.S. PATENT DOCUMENTS

| | | | | |
|---|---|---|---|---|
| 1,966,835 | A * | 7/1934 | Stites | F16B 4/004 411/424 |
| 2,016,610 | A * | 10/1935 | Moeller | F16B 4/004 411/399 |
| 2,126,585 | A * | 8/1938 | Stone | F16B 15/06 411/455 |
| 3,022,701 | A * | 2/1962 | Potruch | F16B 13/126 411/80.1 |
| 3,120,148 | A * | 2/1964 | Prutton | F16B 15/06 411/451.3 |
| 3,133,378 | A * | 5/1964 | Poupitch | F16B 15/04 411/449 |
| 3,921,496 | A * | 11/1975 | Helderman | F16B 13/126 411/17 |
| 5,800,109 | A * | 9/1998 | Carruthers | F16B 19/004 411/455 |
| 7,374,384 | B2 * | 5/2008 | Sutt, Jr. | F16B 15/06 411/422 |
| 2008/0019798 | A1 * | 1/2008 | Lee | F16B 15/00 411/487 |
| 2011/0250035 | A1 | 10/2011 | Goldberg et al. | |

FOREIGN PATENT DOCUMENTS

| | | | |
|---|---|---|---|
| WO | WO9836179 | A1 | 8/1998 |
| WO | WO2007081963 | A2 | 7/2007 |

* cited by examiner

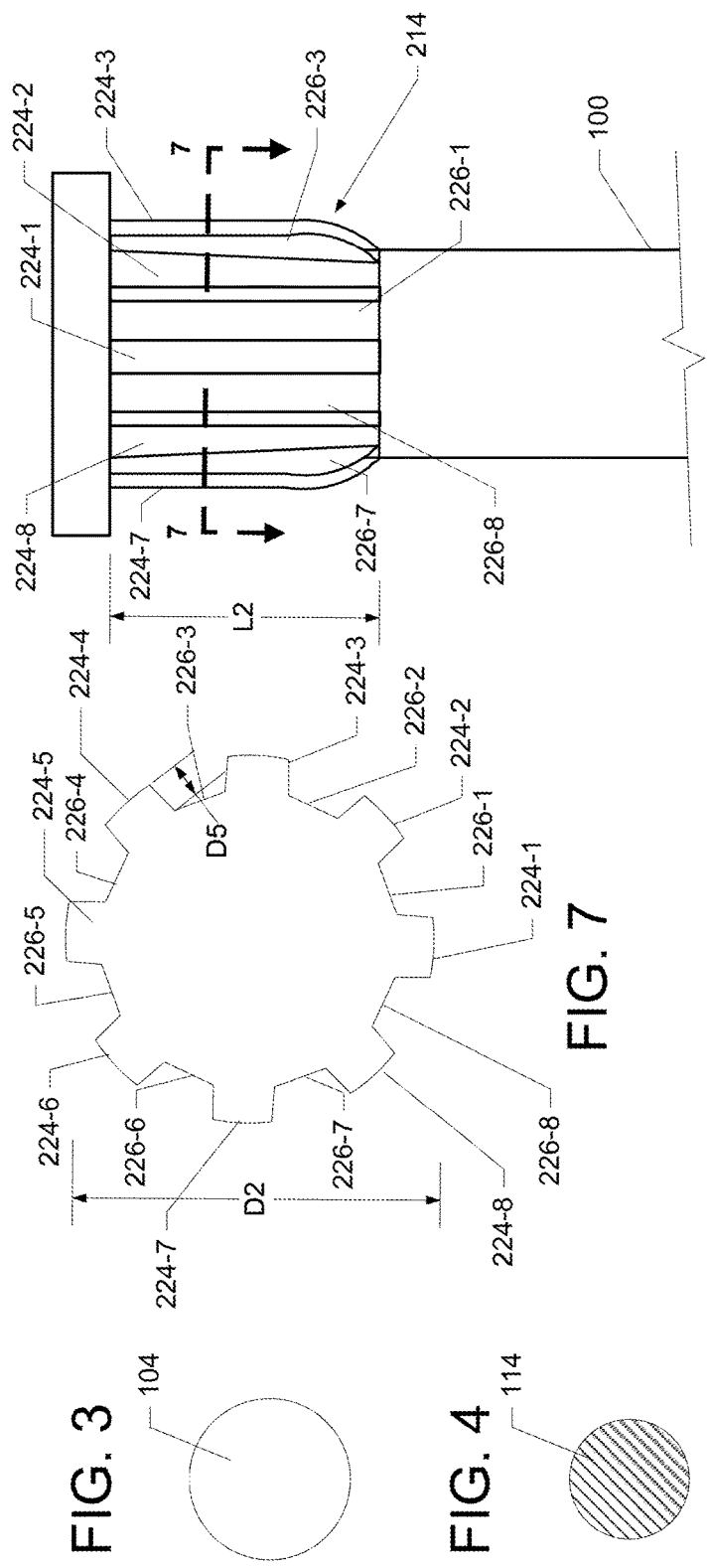

US 10,012,256 B2

SHEAR WALL PERFORMANCE IMPROVING FASTENER

BACKGROUND

Variations in fastener design have been used to improve the ability of the fastener to remain tightly encased in a fastened material. It has been noted that when a diamond point of a nail is formed, an enlarged area at the intersection of the shank and point may also be created. This enlarged area can adversely affect the retention of a fastener in a fastening material, such as when attaching sheathing panels such as plywood or oriented strand board to wood framing members. In such cases, the point can form a hole in the fastening material that is larger than nail shank itself when driven, thus reducing the tightness of fit between the side member and the nail shank.

SUMMARY

Technology is described herein which provides an improved fastener, such as a nail. The fastener may comprise a shank having a first end having a point and a second end having a head. The shank includes a first region beginning at the first end and having a cylindrical cross-section with a first diameter along at least a portion of the first region; and a second region extending from the first region to the head and having a cross section with a second diameter greater than the first diameter. The first region may include a distortion adjacent the tip encompassing at least a portion of a surface of the first region, the distortion having a third diameter greater than the first diameter and less than or equal to the second diameter.

In an alternative embodiment, the shank further includes a plurality of grooves in the first region, the grooves having fourth diameter equal to or less than the second diameter.

Another embodiment of the fastener includes a shank having a first end having a diamond point and a second end having a head. The shank may include a first region beginning having a cylindrical cross-section with a first diameter along at least a portion of the first region. The fastener may also include a second region extending from the point to the first region, the second region having a plurality of grooves having second diameter greater than the first diameter. The fastener may include a third region extending from the first region to the head and having a cross section with a third diameter greater than the first diameter. The third region abuts the head and the second diameter is less than or equal to the third diameter.

Another embodiment of the technology includes a fastener adapted to be embedded in a material to be fastened. The fastener includes a shank having a first end having a point and a second end having a head. The shank includes a first region beginning at the first end and having a cylindrical cross-section with a first diameter along at least a portion of the first region, the first region having a first region length. The shank further includes a second region extending from the first region to the head and having a cross section with a second diameter greater than the first diameter, the second region having a second region length adapted to extend in a range of fifty percent to one-hundred twenty percent of a thickness of the material to be fastened.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 depicts a head end view of the fastener head along line 3-3 in FIGS. 2 and 9.

FIG. 4 depicts a cross-section view of one region of the fastener along line 4-4 in FIGS. 2 and 9.

FIG. 5 depicts a cross section view of another portion of the shank along line 5-5 in FIG. 2.

FIG. 6 is a side view of an alternative embodiment of the expanded diameter region under the head of the fastener.

FIG. 7 is a cross-sectional view along line 7-7 in FIG. 6.

FIG. 9 is a cross section view along line 9-9 in FIG. 8.

DETAILED DESCRIPTION

Figure 1:
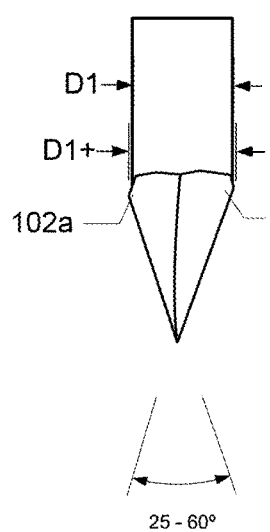
FIG. 1 depicts an enlarged view of a diamond shaped nail point.
Figure 2:
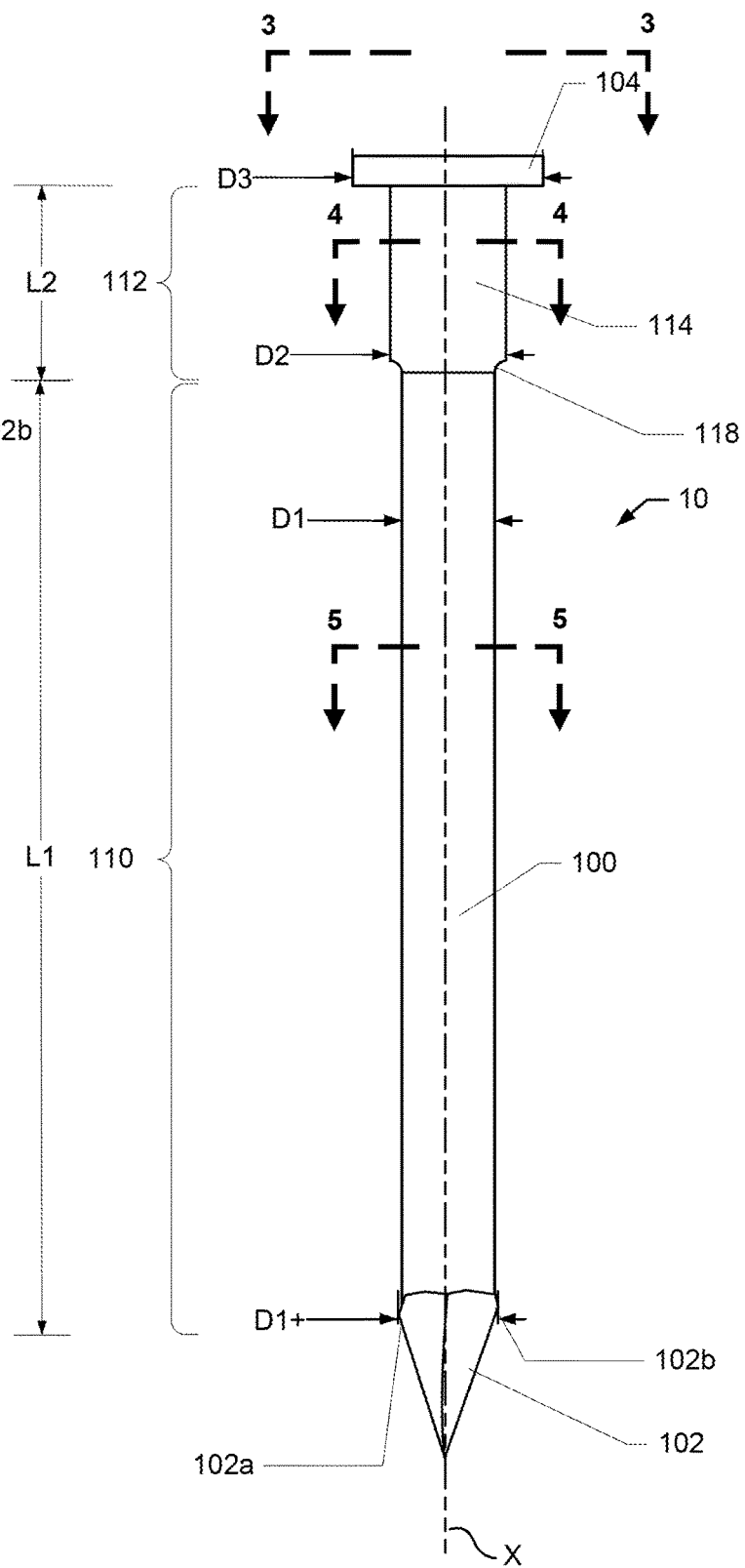
FIG. 2 depicts a plan view of a first embodiment of a fastener in accordance with the present technology.

The technology described herein is a fastener having features improved pullout resistance and improving deflection performance of shear wall systems. The present technology provides a fastener, and in particular a nail fastener, with features to reduce slip in order to make shear wall systems resist plane shear loads while minimizing nail slip.

A first embodiment of the fastener technology will be described with respect to FIGS. 1-5.

A fastener 10 includes a shank 100 having a first end with a pointed tip 102 at and a second end having a head 104. The shank may be formed of steel or any of a number of various materials. The fastener 10 includes a first section or region 110 adjacent the pointed tip 102, and a second section region 112. Each section of shank 100 and head 104 have a generally cylindrical cross section when viewed in cross-section along an axis X, as illustrated in FIGS. 3-5, showing a top view of head 104 (along line 3-3 in FIG. 2), a cross-section of the enlarged cylindrical region 114 in second region 112 (along line 4-4 in FIG. 2) and a cross section of shank 100 in third region 110 along line 5-5 in FIG. 2.

Tip 102 is generally referred to as a "diamond" point formed by a cutting process that results in a distortion of the shank blank. A diamond point is a four-sided taper. Because wood fibers hold a nail in place, nails driven into hardwood tend to resist pull out (withdrawal) better than those driven into softwood. Long sharp diamond points reduce damage to wood fibers when being driven, but tend to split hardwoods. A sharp diamond point aids withdrawal in properly dried softwoods. An important element of quality is that the four tapers are equal and "clean". Although the fastener herein is illustrated with a "diamond" point, a chisel or other type of point—or no point—may be utilized in alternative embodiments of the fastener.

When formed, a diamond point tip 102 may deform the shank as illustrated at portions 102a, 102b of the shank near the tip 102. A linear measure D1+ between two maximum points of distortion 102a, 102b relative to the shank may be determined. The distortion results from the tip forming process and encompasses at least a portion of a surface of the shank adjacent to the tip 102. The distortion maxima 102a and 102b may result in D1+ being in a range of 1.01-1.10 times D1.

Section 110 has a diameter D1 while section 112 has a diameter D2, providing for the enlarged cylindrical region 114. Head 104 has a diameter D3 which may be in a range of 1.5 times to 3 times the diameter D1.

Figure 10:
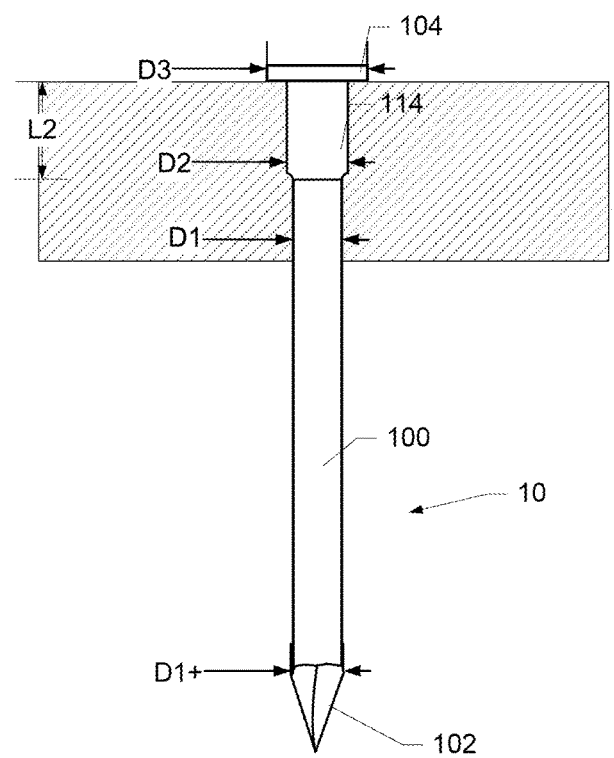
FIG. 10 is a side view of the first embodiment of the fastener embedded in a fastening medium.
Figure 11:
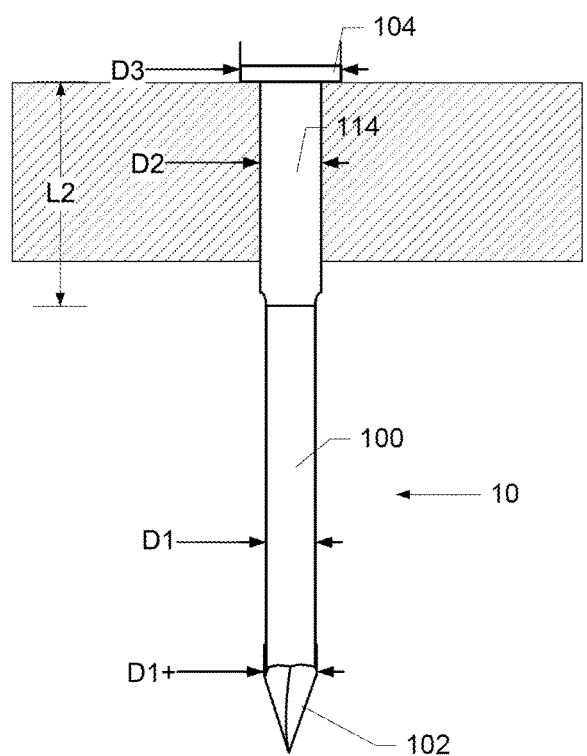
FIG. 11 is a side view of another embodiment of the fastener embedded in a fastening medium.

Fastener 100 provides an enlarged area 114 the under head 104. In one embodiment, diameter D2 is greater than D1 by any percentage between 1 to 50% larger than D1. In one embodiment, D2 is greater than D1 by any percentage between 5-25%, and in other embodiments D2 is greater than D1 by any percentage between 5-10%. In one embodiment, area 114 in region 112 has a cylindrical shape that extends a length L2 which may be configured relative a thickness of the material to be fastened. The length L2 is in the range of 50-120 percent of the thickness of the material to be fastened. A 50 percent length L2 (a length 50 percent of the length of the thickness of the material to be fastened) is illustrated in FIG. 10. A 120 percent length L2 (a length 120 percent of the length of the thickness of the material to be fastened) is illustrated in FIG. 11. For example, if a fastener is 0.1 inches in diameter and configured to attach ½ inch sheathing, it would have an enlarged cylindrical area 114 under the head 104 that would be 0.105 to 0.110 inches in diameter that would extend 0.25 to 0.6 inches under head 104. Typical nails utilizing this feature range from 0.080 to 0.25 inches in diameter (D1) with total lengths (L1+L2) from 0.5 to 8 inches long.

A second embodiment of an enlarged region 214 which may be incorporated into the fastener is illustrated in FIGS. 6 and 7. Region 214 includes a plurality of ridges 224-1 to 224-8 formed in a direction parallel with the shank 100. The ridges 224-1 to 224-8 are separated by a plurality of trenches 226-1 to 226-8. Each trench has a depth D5. Diameter D2 is defined by two opposing ridges, for example ridges 224-1 and 224-5. Region 214 provides a circular perimeter (defined by the surfaces of ridges 224-1 to 224-8) on which the material to be fastened bears on the fastener with less area than a fully solid cylinder. This is beneficial in the fastener forming process as the more steel that is used for the cylinder under the head, the less steel is available to make the head.

Figure 8:
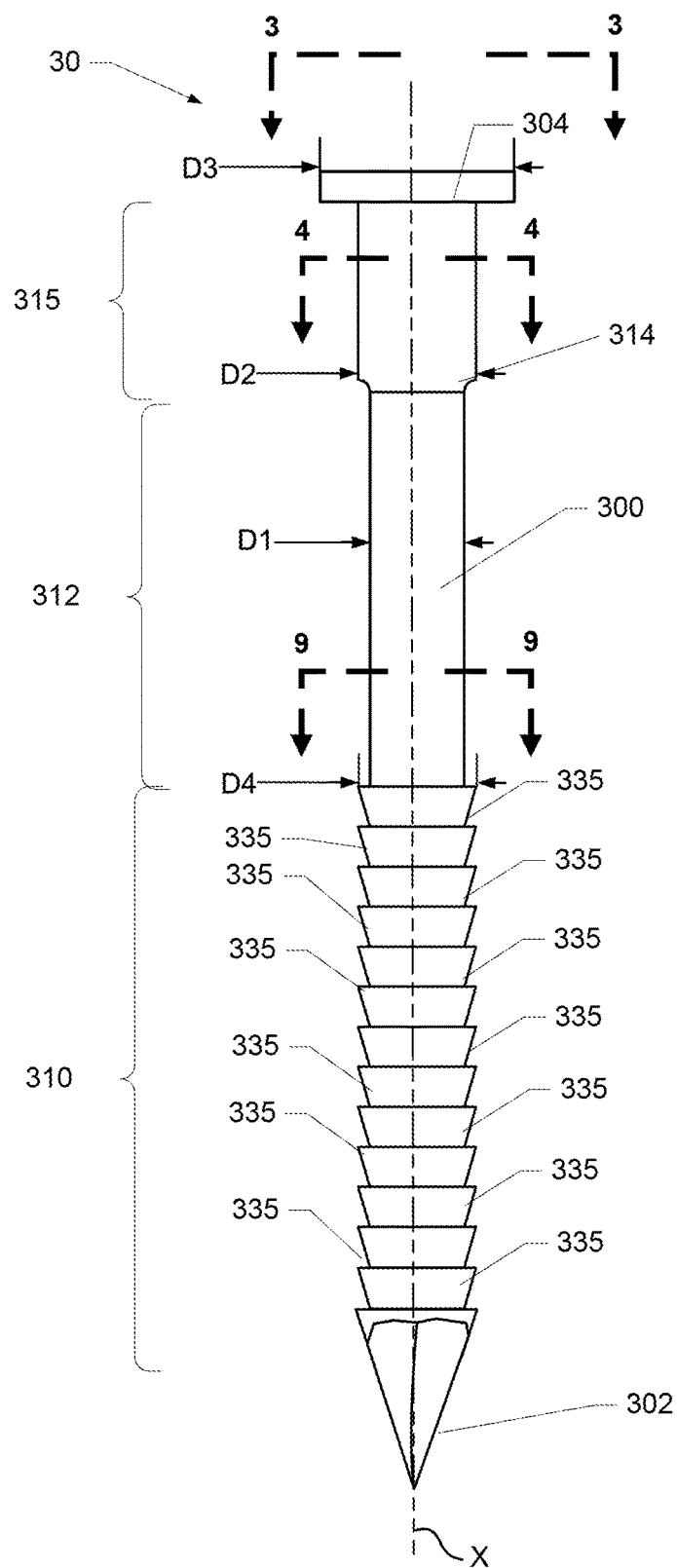
FIG. 8 depicts a plan view of another embodiment of a fastener in accordance with the present technology.

Another embodiment of the fastener technology is illustrated in FIGS. 8 and 9.

A fastener 30 includes a shank 300 having a first end with a pointed tip 302 at and a second end having a head 304. The shank may be formed of steel or any of a number of various materials. The fastener 30 includes a first section or region 310 including the pointed end 302, a second section or region 312 formed by the main body of the shank 300, and a third section or region 315 formed by cylindrical region 314.

The first section 310 may include grooves 335 having a trapezoidal cross section when viewed along a line perpendicular to axis X in the view of FIG. 8. Head 304 and shank 300 have a generally cylindrical cross section when viewed in cross section along an axis X as indicated at FIG. 3 (along line 3-3) and FIG. 9 (along line 9-9), respectively. Each groove 335 also has a generally cylindrical cross-sections, as illustrated at FIG. 9. Each groove 335 has a diameter D4 which in one embodiment equals diameter D2. In an alternative embodiment, D4 is less than D2. While the grooves are illustrated as annular ring barbs, any combination of ring barbs, helical threads or deformed shank elements comprising ridges or grooves along the shank may be utilized as the grooves 335.

The grooves 335 create a hole in a fastened material that is larger than shank 300 in region 314. However, it has been determined that in certain applications, including shear resisting wall systems, the benefits of deforming the shank to decrease the withdrawal of the nail are counterbalanced by an increased slip in shear resistance that is created by shank distortions. The tightness in fit between the nail fastener and the sheathing material has been determined to be directly correlated to deflection performance of shear wall systems. Deflection performance is the amount the top of the shear wall moves when subject to an in plane shear load. Certain building code accepted test methods require shear walls to a resist a certain amount of load at a pre-determined deflection. It is desirable to resist as much load with a minimum of deflection. Reducing energy loss of structures is an increasing trend driven by changing energy codes which is resulting an increase in insulation in wall systems. One method used is to increase the amount of insulation between the wood framing members and the sheathing. When the sheathing is not in contact with the wall framing members, the eccentricity can exacerbate the slip in a connection when subject to in plane shear loads making it difficult to achieve the loads required by the building code accepted test methods.

Testing with a 2.4375 inch thick insulation panel consisting of a 2 inch layer of insulation foam attached to 7/16 inch thick oriented strand board (OSB) panel showed an improvement in initial stiffness using the present technology. In single fastener shear tests conducted in accordance with ASTM D1761 using both a monotonic and cyclic loading protocol, a 0.162 inch diameter, 4 inch long nail with a 0.365 inch diameter head was evaluated in direct comparison to a 0.162 inch diameter, 4 inch long nail with a 0.365 head and the enlarged cylindrical area (114, 314) under the head. The fastener with the enlarged cylindrical area under the head had 19% more initial stiffness in the monotonic shear test than the nail without the enlarged cylindrical area. The nail with the enlarged cylindrical area under the head had 8% more initial stiffness in the cyclic shear test than the nail without the enlarged cylindrical area.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener, comprising:
   a shank having a first end having a point and a second end having a head, the shank including
      a first region beginning at the first end and having a surface forming a continuous cylindrical cross-section with a first diameter (D1) along at least a portion of the first region;
      a tip at one end of the first region; and
      a second region extending from another end of the first region to the head and having a cross section with a second diameter (D2) greater than the first diameter and smaller than a head diameter, the second region having a length and abutting the head;
   wherein first region includes a distortion (102a,102b) extending away from the surface and adjacent to the tip encompassing at least a portion of a surface of the first region, the distortion having a linear measure between distortion maxima (D1+) greater than the first diameter and less than or equal to the second diameter.

2. The fastener of claim 1 wherein the shank further includes a plurality of grooves in the first region, the grooves having fourth diameter equal to or less than the second diameter.

3. The fastener of claim 1 wherein the second diameter (D2) is 1.05 to 1.10 times the first diameter (D1).

4. The fastener of claim 1 wherein the second diameter (D2) is 5 to 10 percent greater than the linear measure (D1+).

5. The fastener of claim 1 wherein the second region includes a surface defining a continuous cylindrical diameter and a rounded edge is positioned at an interface between the first and second regions.

6. The fastener of claim 1 wherein the second region includes a plurality of ridges defining the second diameter.

7. The fastener of claim 6 wherein each ridge is separated from an adjacent ridge by a trench having a depth (D5).

8. A fastener, comprising:
a shank having a first end having a pointed tip and a second end having a head, the shank including
a first region beginning at the first end having a continuous cylindrical cross-section in the first region with a first diameter (D1) along the first region;
a second region extending from the tip to the first region, the second region having a plurality of grooves having second diameter (D4) greater than the first diameter (D1), wherein the plurality of grooves has a cylindrical cross-section viewed parallel to an axis of the shank and a trapezoidal cross-section viewed perpendicular to the axis of the shank, each trapezoidal cross-section abutting an adjacent trapezoidal cross-section; and
a third region extending from the first region to the head and having a cross section with a third diameter (D2) greater than the first diameter and smaller than a head diameter, the third region abutting the head wherein the second diameter (D4) is less than or equal to the third diameter (D2).

9. The fastener of claim 8 wherein the plurality of grooves extends from the tip to the first region, each of the plurality of grooves being evenly spaced from adjacent grooves.

10. The fastener of claim 8 wherein the second diameter (D2) is 5 to 10 percent greater than the fourth diameter (D1+).

11. The fastener of claim 8 wherein the third region includes a surface defining a continuous cylindrical diameter.

12. The fastener of claim 8 wherein the third region includes a plurality of ridges, each of the ridges defining the second diameter with an opposing ridge 180 degrees apart from said each ridge.

13. The fastener of claim 12 wherein each ridge is separated from an adjacent ridge by a trench having a depth.

14. A fastener adapted to be embedded in a material to be fastened, comprising:
a shank having a first end having a tip including a point and a second end having a head, the shank including
a first region beginning at the first end and having a surface forming a cylindrical cross-section with a first diameter (D1) along at least a portion of the first region, the first region having a first region length; and
a second region extending from the first region to the head and having a cross section with a second diameter (D2) greater than the first diameter and smaller than a head diameter, the second region having a second region length adapted to extend in a range of fifty percent to one-hundred twenty percent of a thickness of the material to be fastened;
wherein the first region includes a distortion (102a,102b) extending away from the tip and the surface at one end of the tip, and encompassing at least a portion of a surface of the first region, the distortion having a linear measure (D1+) greater than the first diameter and less than or equal to the second diameter.

15. The fastener of claim 14 wherein the material to be fastened includes a wood portion and an insulation portion, and said thickness includes a combined thickness of the wood portion and the insulation portion.

16. The fastener of claim 15 wherein the shank further includes a plurality of grooves in the first region, the grooves having fourth diameter equal to or less than the second diameter, the grooves having a cylindrical cross-section viewed parallel to an axis of the shank and a trapezoidal cross-section viewed perpendicular to the axis of the shank.

17. The fastener of claim 16 wherein the second diameter (D2) is 1.05 to 1.10 times the first diameter (D1).

18. The fastener of claim 17 wherein the second diameter (D2) is 5 to 10 percent greater than the linear measure (D1+).

* * * * *